(12) United States Patent
Murakami et al.

(10) Patent No.: US 7,354,632 B2
(45) Date of Patent: Apr. 8, 2008

(54) OPTICAL LAMINATE

(75) Inventors: Toshihide Murakami, Tokyo (JP); Kohei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 508 days.

(21) Appl. No.: 10/997,951

(22) Filed: Nov. 29, 2004

(65) Prior Publication Data

US 2005/0249890 A1 Nov. 10, 2005

Related U.S. Application Data

(63) Continuation-in-part of application No. PCT/JP03/06695, filed on May 28, 2003.

(30) Foreign Application Priority Data

May 30, 2002 (JP) ............................. 2002-157610

(51) Int. Cl.
*G02F 1/13363* (2006.01)
*G02B 5/30* (2006.01)
(52) U.S. Cl. ..................... 428/1.3; 428/1.1; 349/117; 349/121
(58) Field of Classification Search ............... 428/1.1, 428/1.3; 349/117–121
See application file for complete search history.

(56) References Cited

U.S. PATENT DOCUMENTS

| 5,138,474 | A | * | 8/1992 | Arakawa ..................... 349/120 |
| 5,966,242 | A | * | 10/1999 | Yamanaka ................... 359/618 |
| 6,034,753 | A | * | 3/2000 | Li et al. ........................ 349/98 |
| 6,346,578 | B2 | * | 2/2002 | Arakawa ..................... 525/210 |
| 6,641,924 | B1 | * | 11/2003 | Peiffer et al. ................ 428/480 |
| 6,762,811 | B2 | * | 7/2004 | Sasaki et al. ................ 349/118 |
| 6,977,700 | B2 | * | 12/2005 | Uesaka et al. .............. 349/114 |
| 7,215,839 | B2 | * | 5/2007 | Kawahara et al. ............ 385/11 |
| 2002/0008840 | A1 | | 1/2002 | Sakamaki et al. |

FOREIGN PATENT DOCUMENTS

| JP | 10-68816 A | 3/1998 |
| JP | 2002-86554 A | 3/2000 |
| WO | WO 03/102639 A1 | * 12/2003 |

* cited by examiner

*Primary Examiner*—Rena Dye
*Assistant Examiner*—Sow-Fun Hon
(74) *Attorney, Agent, or Firm*—Birch, Stewart, Kolasch & Birch, LLP

(57) ABSTRACT

Provided are: a long optical laminate prepared by laminating two obliquely stretched long phase-difference films so that the respective delayed-phase axes cross each other at a specified angle, while at least one of the two phase-difference films is a film containing residual volatile component by 1000 ppm or less; a long optical element prepared by laminating the optical laminate on one surface of polarization film; a long broad-band ¼ wavelength plate; an optical member prepared by laminating a circularly polarized light separating layer of cholesteric liquid crystal on one surface of the broad-band ¼ wavelength plate; a broad-band circular element using the broad-band ¼ wavelength plate; and an optical product having the broad-band circular polarization element. The invention provides long optical laminates having high optical characteristics stability, long broad-band ¼ wavelength plates, long optical elements, broad-band circular polarization elements, and various optical products having the broad-band circular polarization element.

14 Claims, 4 Drawing Sheets

OPTICAL LAMINATE

This application is a Continuation-In-Part of co-pending application Ser. No. PCT/JP03/06695 filed on May 28, 2003, the entire contents of which are hereby incorporated by reference and for which priority is claimed under 35 U.S.C. § 120.

TECHNICAL FIELD

The present invention relates to an optical laminate having a novel layer structure, an optical element having the optical laminate, a broad-band ¼ wavelength plate, a broad-band circular polarization element, an optical member, and an optical product having the broad-band circular polarization element.

BACKGROUND ART

A negative-retarder (a phase-difference element having a negative phase-difference in the vertical direction to the element plane) is known as a phase-difference plate which gives optical compensation to the characteristics of angle of visibility (angle-dependency of phase-difference) on a vertically aligned (VA) type liquid crystal display by inserting the phase-difference plate between a liquid crystal cell and a polarization element, both of which are the components of a liquid crystal display unit.

That type of negative-retarder is prepared by a procedure given below. First, a resin film is subjected to uniaxial stretch while allowing free shrinkage thereof in the direction perpendicular to the stretching direction to form a stretched film that satisfies the condition of Nx>Ny≧Nz, (Nx is the intraplane refractive index in the stretching direction, Ny is the intraplane refractive index in the direction perpendicular to the stretching direction, and Nz is the refractive index in the thickness direction). Secondly, the stretched film is cut to prepare a rectangular chip in which the longer side thereof is along the stretched direction, and another chip having the same shape in which the shorter side thereof is along the stretched direction. Thirdly, those two chips are stuck together using an adhesive or a bond, (what is called the "patching"), so that the respective stretched directions thereof perpendicularly cross each other, thus obtaining the negative-retarder. To manufacture the negative-retarder having the above-described structure, however, there is a problem of repeated troublesome works including sticking the cut-to-form chips together, which degrades the production efficiency.

There is a known phase-difference plate, which is prepared by sticking a stretched film giving a ¼ wavelength phase-difference to a specific wavelength, (¼ wavelength plate), and a stretched film giving a ½ wavelength phase-difference to a specific wavelength, (½ wavelength plate), with each other so that the respective delayed-phase axes thereof cross with each other at a specified angle (for example, 50 to 70 degrees). The phase-difference plate functions as a broad-band ¼ wavelength plate which gives small variations in the phase-difference under wavelength variations. Thus, by laminating with a linear polarization element, the phase-difference plate provides a broad-band circular polarization element which can obtain circular polarization over a wide wavelength range.

The broad-band ¼ wavelength plate is manufactured by cutting or punching each of the stretched films prepared by uniaxial stretching, (a ¼ wavelength plate and a ½ wavelength plate), in different directions to the stretched direction, respectively, thus to form chips having the same shape (rectangular shape), and then by sticking them together using an adhesive or a bond.

To manufacture the above-described phase-difference plate (broad-band ¼ wavelength plate), however, there is a problem of repeated troublesome works including cutting (punching) films to form chips, then sticking the chips together, which degrades the production efficiency. In addition, since the cutting is done at a specific angle to the stretched direction, cut-loss is unavoidably generated, which raises a problem of loss in raw material.

The present invention was derived to cope with the above-described situation. A first purpose of the present invention is to provide a long optical laminate which has wanted optical characteristics, has high stability in optical characteristics, is preferably used as a negative-retarder, and gives high production efficiency.

A second purpose of the present invention is to provide a long broad-band ¼ wavelength plate which has high optical compensation performance to the characteristics of angle of visibility, applies the long optical laminate, effectively uses a stretched film as the raw material, and gives high production efficiency.

A third purpose of the present invention is to provide a long optical element and a broad-band circular polarization element which have high performance to provide ¼ wavelength phase-difference to a wide wavelength range, uses the long broad-band ¼ wavelength plate, and gives high production efficiency.

A fourth purpose of the present invention is to provide an optical element having the broad-band circular polarization element, a reflection liquid crystal display unit, a touch panel, and an electro-luminescence display unit.

DISCLOSURE OF THE INVENTION

The inventors of the present invention conducted detail study to solve the above-described purposes, and found that a long optical laminate prepared by laminating two obliquely stretched long phase-difference films so that the respective delayed-phase axes thereof cross each other at a specified angle has high optical characteristics including optical compensation of the characteristics of angle of visibility, and gives high production efficiency.

Also the inventors of the present invention found that, on manufacturing the optical laminate, use of at least one phase-difference film having the residual volatile component not exceeding a specified concentration among the two thereof provides an optical laminate having stable optical characteristics.

Furthermore, the inventors of the present invention found that a long broad-band ¼ wavelength plate is obtained by using long phase-difference films stretched in a specified direction as a ½ wavelength plate and a ¼ wavelength plate, and by laminating them together specifying the angle of crossing of each of the delayed-phase axes. Based on these findings, the present invention has been completed.

According to a first aspect of the present invention, there is provided a long optical laminate having two obliquely stretched long phase-difference films laminated so that the respective delayed-phase axes thereof cross each other at a specified angle, while at least one of the two phase-difference films contains a residual volatile component by not more than 1000 ppm.

The optical laminate according to the present invention is preferably the one in which at least one of the two phase-difference films is a film obtained by obliquely stretching a thermoplastic resin film prepared by melt-extrusion. The thermoplastic resin film is more preferably a polymer resin having an alicyclic structure.

The optical laminate according to the present invention preferably has two phase-difference films which are obliquely stretched in an angle of (45±5) degrees to the width direction thereof, and are laminated together so that the respective delayed-phase axes thereof cross each other at an angle of (90±10) degrees, where the intraplane refractive index in an arbitrary direction on each film is preferably substantially the same with each other, and further the refractive index is preferably larger than that in the thickness direction.

According to a second aspect of the present invention, there is provided an optical element prepared by laminating the optical laminate according to the present invention on one surface of a polarization film. The optical element is preferably prepared by laminating a protective film on the other side of the polarization film.

According to a third aspect of the present invention, there is provided a long broad-band ¼ wavelength plate, having: a long ½ wavelength plate having a phase-difference film treated by obliquely stretching so that the angle between the width direction thereof and a delayed-phase axis thereof is adjusted to become in a range from 15 to 45 degrees; and a long ¼ wavelength plate having a phase-difference film treated by obliquely stretching so that the angle between the width direction thereof and a delayed-phase axis thereof is adjusted to become in a range from 15 to 45 degrees being laminated on the long ½ wavelength plate crossing the respective delayed-phase axes thereof at an angle of (60±3) degrees with each other; a residual volatile component in the phase-difference film in at least one of the ½ wavelength plate and the ¼ wavelength plate being not more than 1000 ppm.

Regarding the broad-band ¼ wavelength plate according to the present invention, a phase-difference film structuring at least one of the ½ wavelength plate and the ¼ wavelength plate is prepared by obliquely stretching a thermoplastic resin film obtained by melt-extrusion. The thermoplastic resin film is more preferably a polymer resin having an alicyclic structure.

According to a fourth aspect of the present invention, there is provided an optical member having a circularly polarized light separating layer made of a cholesteric liquid crystal being laminated on one surface of the broad-band ¼ wavelength plate.

According to a fifth aspect of the present invention, there is provided a broad-band circular polarization element on which a linear polarization element is laminated on one surface of the broad-band ¼ wavelength plate, where the angle between a polarization-transmission axis of the linear polarization element and a delayed-phase axis of a ½ wavelength plate structuring the broad-band ¼ wavelength plate is (15±3) degrees.

According to a sixth aspect of the present invention, an optical product having the broad-band circular polarization element according to the present invention is provided. The optical product according to the present invention is preferably a reflection liquid crystal display unit, a touch panel, or an electro-luminescence display unit.

BEST MODES FOR CARRYING OUT THE INVENTION

Figure 1:
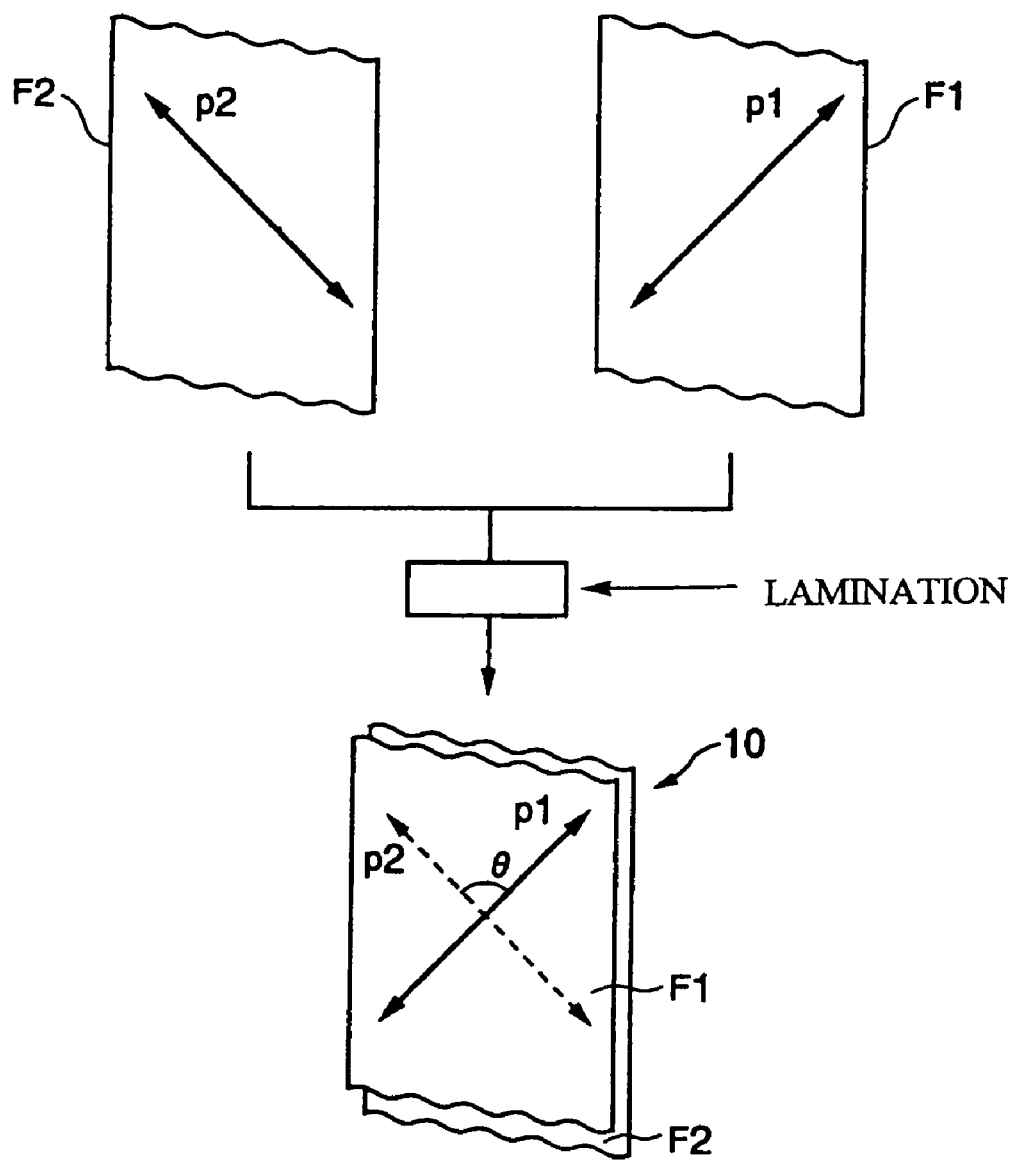
FIG. 1 is a schematic drawing illustrating a part of the manufacturing process, (sticking), of the optical laminate according to the present invention.

The present invention is described below in more detail.

1) Optical Laminate

The optical laminate according to the present invention is the one prepared by laminating two obliquely stretched long phase-difference films so that the respective delayed-phase axes thereof cross each other at a specified angle, and at least one of the two phase-difference films structuring the optical laminate contains a residual volatile component by not more than 1000 ppm.

(1) Phase-difference Film

The resin for forming the phase-difference film is not specifically limited if only the resin is a thermoplastic resin having good transparency. Examples of the thermoplastic resin are an olefin-base polymer, a polymer resin having an alicyclic structure, a polycarbonate-base polymer, a polyester-base polymer, a polysulfone-base polymer, a polyether sulfone-base polymer, a polystyrene-base polymer, a polyolefin-base polymer, a polyvinylalcohol-base polymer, a cellulose acetate-base polymer, a polyvinylchloride-base polymer, and a polymethacrylate-base polymer. Among them, the olefin-base polymer and the polymer resin having an alicyclic structure are preferred, and the polymer resin having an alicyclic structure are particularly preferable.

The polymer resin having an alicyclic structure has the alicyclic structure in the repeating unit of the polymer resin. Both the polymer resin having the alicyclic structure in the main chain and that having the alicyclic structure in the side chain are applicable.

The alicyclic structure includes a cycloalkane structure and a cycloalkene structure. From the point of thermal stability and other characteristics, the cycloalkane structure is preferred. Although there is no specific limitation on the number of carbon atoms in the alicyclic structure, normally the number is from 4 to 30, preferably from 5 to 20, and most preferably from 6 to 15. The number of carbon atoms in the alicyclic structure within the range allows providing a stretched film having excellent heat resistance and flexibility.

The percentage of the repeating unit having the alicyclic structure in the polymer resin having the alicyclic structure may be adequately selected depending on the use object. Normally, the percentage thereof is 50% by weight or more, preferably 70% by weight or more, and most preferably 90% by weight or more. If the number of repeating units having the alicyclic structure is excessively small, the heat resistance degrades, which is unfavorable. The repeating unit other than the repeating unit having an alicyclic structure in the polymer resin containing an alicyclic structure may be adequately selected depending on the use object.

Examples of the polymer resin containing an alicyclic structure are (1) a norbornene-base polymer, (2) a monocyclic olefin polymer, (3) a cyclic conjugated diene-base polymer, (4) a vinyl-alicyclic hydrocarbon polymer, and a hydride of any of (1) through (4). Among them, the hydride of norbornene-base polymer, the vinyl-alicyclic hydrocarbon polymer, and the hydride thereof are preferred in view of superior heat resistance and mechanical strength, and the hydride of norbornene-base polymer is more preferable.

The norbornene-base polymer used in the present invention is a polymer of monomer consisting mainly of norbornene-base monomer such as norbornene and a derivative thereof, tetracyclododecene and a derivative thereof, dicyclopentadiene and a derivative thereof, and methanotetrahydrofluorene and a derivative thereof.

Examples of the norbornene-base polymer are, (i) a ring-opening polymer of norbornene-base monomer, (ii) a ring-opening copolymer of norbornene-base monomer and other monomer which is able to polymerize therewith, (iii) an addition-polymerization product of norbornene-base monomer, (iv) an addition-polymerization product of norbornene-base monomer and other monomer which is able to polymerize therewith, and a hydride of any of (i) through (iv).

Examples of the norbornene-base monomer are, bicyclo[2,2,1]hepto-2-ene (common name: Norbornene), tricyclo[4,3,0,1$^{2,5}$]deca-3,7-diene (common name: Dicyclopentadiene), 7,8-benzotricyclo[4,3,0,1$^{2,5}$]deca-3-ene (common name: Methanotetrahydrofluorene), tetracyclo[4,4,0,1$^{2,5}$,1$^{7,10}$]dodeca-3-ene (common name: Tetracyclododecene), and a derivative of any of these compounds, (for example, a derivative thereof having a substituent at the ring). Examples of the substituent are alkyl group, alkylene group, alkoxycarbonyl group, and carboxyl group. These substituents may be one or more thereof binding with the ring by the same groups or different groups. The norbornene-base monomer may be used separately or in combination with other types.

Other monomer capable of copolymerizing with the norbornene-base monomer includes: a norbornene-base monomer such as bicyclo[2,2,1]hepto-2-ene (common name: Norbornene) and a derivative thereof, and tetracyclo[4,4,0,1$^{2,5}$, 1$^{7,10}$]dodeca-3-ene (common name: Tetracyclododecene) and a derivative thereof; a monocyclic olefin such as cyclohexene, cycloheptene, and cyclooctene, and a derivative thereof; and a cyclic conjugated diene such as cyclohexadiene and cycloheptadiene, and a derivative thereof.

The ring-opening polymerization product of norbornene-base monomer and the ring-opening copolymerization product of norbornene-base monomer and other monomer which is able to conduct ring-opening copolymerization therewith may be prepared by (co)polymerizing the monomer under the presence of a ring-opening polymerization catalyst.

Applicable ring-opening polymerization catalyst includes: a catalyst consisting essentially of a metallic halide such as that of ruthenium and osmium, a sulfate or an acetylacetone compound, and a reducing agent; and a catalyst consisting essentially of a metallic halide such as that of titanium, zirconium, tungsten, and molybdenum, or an acetylacetone compound, and an organic aluminum compound.

The addition-polymerization product of a norbornene-base monomer and the addition-copolymerization product of other monomer which is able to conduct addition-copolymerization with the norbornene-base monomer may be prepared by polymerizing a monomer under the presence of an addition-polymerization catalyst.

An example of the addition-polymerization catalyst is a catalyst consisting essentially of a metallic compound such as that of titanium, zirconium, and vanadium, and an organic aluminum compound.

Examples of other monomer which is able to conduct addition-copolymerization with norbornene-base monomer are: an α-olefin having 2 to 20 carbon atoms, such as ethylene, propylene, 1-butene, 1-pentene, 1-octene, 1-decene, 1-dodecene, 1-tetradecene, 1-hexadecene, 1-octadecene, and 1-eicosene, and a derivative of any of them; a cycloolefin such as cyclobutene, cyclopentene, cyclohexene, cyclooctene, and 3a,5,6,7a-tetrahydro-4,7-methano-1H-indene, and a derivative of any of them; and a non-conjugated diene such as 1,4-hexadiene, 4-methyl-1,4-hexadiene, 5-methyl-1,4-hexadiene, and 1,7-octadiene. These monomers may be used separately or in combination of two or more thereof. Among them, α-olefin is preferred, and ethylene is more preferable.

The monocyclic olefin-base polymer used in the present invention includes an addition-polymerization product of cyclohexene, cycloheptene, and cyclooctene.

The cyclic conjugated diene-base polymer used in the present invention includes a polymer of 1,2-addition polymerization or 1,4-addition polymerization of a cyclic conjugated diene-base monomer such as cyclopentadiene and cyclohexadiene.

The molecular weight of norbornene-base polymer, monocyclic olefin polymer, and cyclic conjugated diene polymer may be adequately selected depending on the use object. The range of the molecular weight is normally from 10,000 to 100,000 by weight average molecular weight as polyisoprene or polystyrene, determined by gel-permeation chromatography using cyclohexane as the solvent (toluene for the case of insoluble polymer resin), preferably from 25,000 to 80,000, and more preferably from 25,000 to 50,000. The weight average molecular weight in the range is favorable because the film mechanical strength and the forming workability are highly balanced therebetween.

The vinyl-alicyclic hydrocarbon polymer is a polymer which has a repeating unit originated from vinylcycloalkane or vinylcycloalkene. Examples of the vinyl-alicyclic hydrocarbon polymer are: a polymer of vinyl-alicyclic hydrocarbon compound including vinylcycloalkane such as vinylcyclohexane and vinylcycloalkene such as vinylcyclohexene, and a hydride thereof; and a hydride of an aromatic portion of a polymer of vinyl-aromatic hydrocarbon compound such as styrene and α-methylstyrene.

The vinyl-alicyclic hydrocarbon polymer may be a copolymer such as random copolymer and block copolymer of a vinyl-alicyclic hydrocarbon compound and a vinyl-aromatic hydrocarbon compound with other monomer which is coporimerizable therewith, and a hydride thereof. The block copolymerization may be diblock copolymerization, triblock copolymerization, higher multi-block copolymerization, and graded block copolymerization. However, there is no specific limitation on the block copolymerization.

The molecular weight of vinyl-alicyclic hydrocarbon polymer may be adequately selected depending on the use object. The range of the molecular weight is normally from 10,000 to 300,000 by weight average molecular weight as polyisoprene or polystyrene, determined by gel-permeation chromatography using cyclohexane as the solvent (toluene in the case of insoluble polymer resin), preferably from 15,000 to 250,000, and more preferably from 20,000 to 200,000. The weight average molecular weight in the range is favorable because the mechanical strength of the formed article and the forming workability are highly balanced therebetween.

The hydride of the ring-opening polymerization product of norbornene-base monomer, of the ring-opening copolymerization product of norbornene-base monomer and other monomer which is able to conduct ring-opening copolymerization therewith, of the addition-polymerization product of norbornene-base monomer, and of the addition-polymerization product of norbornene-base monomer and other monomer which is able to copolymerize therewith may be prepared by adding a known hydrogenation catalyst containing transition metal such as nickel and palladium to a solution of polymer thereof to execute the hydrogenation of carbon-carbon unsaturated bond by preferably 90% or more.

A preferable glass transition temperature of the polymer resin having an alicyclic structure according to the present invention may be adequately selected depending on the use object. The glass transition temperature thereof is, however, preferably 80° C. or above, and more preferably from 100° C. to 250° C. A film containing the polymer resin having an alicyclic structure giving the glass transition temperature in that range shows superior durability without generating deformation and stress under the high temperature application.

Although the molecular weight distribution (weight average molecular weight (Mw)/number average molecular weight (Mn)) of the polymer resin having an alicyclic structure preferable to the present invention is not specifically limited. Normally, the molecular weight distribution is in a range from 1.0 to 10.0, preferably from 1.1 to 4.0, and more preferably from 1.2 to 3.5.

Among these polymer resins having an alicyclic structure according to the present invention, preferably used are a resin having 10% by weight or more of the repeating unit containing tricyclo[4,3,0,1$^{2,5}$]decane-7,9-diyl-ethylene structure and/or a resin having 55 to 90% by weight of the repeating unit containing bicyclo[3,3,0]octane-2,4-diyl-ethylene structure. With the use of these resins, a stretched film giving no dimensional change over a long time and having superior stability of optical characteristics is obtained.

An example of the method for adjusting the above-given range of the repeating unit containing the tricyclo[4,3,0,1$^{2,5}$]decane-7,9-diyl-ethylene structure in the polymer resin having an alicyclic structure is a method of polymerizing a monomer mixture containing 10% by weight or more of tetracyclo[4,4,0,1$^{2,5}$,1$^{7,10}$]dodeca-3-ene (also called "tetracyclododecene") or a derivative thereof (having a substituent on the ring) by a known methathesis ring-opening polymerization, followed by hydrogenating the carbon-carbon unsaturated bond in the ring using a known method.

An example of the method for adjusting the above-given range of the repeating unit having bicyclo[3,3,0]octane-2,4-diyl-ethylene structure is a method of polymerizing a monomer mixture containing 55 to 90% by weight of norbornene-base monomer having a structure of norbornene ring bonded with a five-membered ring by a known methathesis ring-opening polymerization, followed by hydrogenating the carbon-carbon unsaturated bond in the ring using a known method.

Applicable norbornene-base monomer having the structure of norbornene ring bonded with a five-membered ring includes tricyclo[4,3,0,1$^{2,5}$]deca-3,7-diene and a derivative thereof (having a substituent in the ring), 7,8-benzotricyclo[4,3,0,1$^{2,5}$]deca-3-ene and a derivative thereof.

According to the present invention, also preferably applicable is a polymer prepared by applying ring-opening polymerization to a norbornene-base monomer having the structure of the norbornene ring bonded with a five-membered ring and/or tetracyclo[4,4,0,1$^{2,5}$,1$^{7,10}$]dodeca-3-ene or a derivative thereof with other monomer which is able to copolymerize therewith.

The phase-difference film according to the present invention may be prepared by obliquely stretching a non-stretched film made of the above-described thermoplastic resin as the resin structuring the phase-difference film.

The non-stretched film may be prepared by forming a resin into a film shape. The method for forming resin into film shape is not specifically limited, and a known forming method is applicable. For example, thermoforming processor solution cast film process may be applied. From the point of decreasing the volatile component in the film, the thermoforming process is preferred.

The thermoforming process is further classified to melt-extrusion method, press-forming method, inflation method, injection-molding method, blow-molding method, cast method, and the like. Among them, the melt-extrusion method is preferred to obtain a stretched film giving superior mechanical strength, surface accuracy, and other characteristics.

The forming condition may be adequately selected depending on the use object and the forming method. When the melt-extrusion method is applied, the cylinder temperature is adequately determined in a range of preferably from 100° C. to 600° C., and more preferably from 150° C. to 350° C.

The thickness of non-stretched film can be adequately determined depending on the use object and other characteristics of the obtained stretched film. Since a homogeneous stretched film is obtained by stable stretching treatment, the thickness of non-stretched film is preferably in a range from 10 to 300 μm, and more preferably from 30 to 200 μm.

For preparing a non-stretched film, other additive may be added to the composition thereof within a range that does not give bad influence to the object of the present invention. Examples of other additive are plasticizer and anti-degradation agent.

The plasticizer is added to improve the mechanical properties of the film and also to increase the drying speed thereof. Applicable plasticizer includes phosphoric acid ester and carboxylic acid ester.

Applicable phosphoric acid ester includes triphenylphosphate and tricresylphosphate. Applicable carboxylic ester includes: phthalic acid ester such as dimethylphthalate, diethylphthalate, dibutylphthalate, dioctylphthalate, and diphenylphthalate; citric acid ester such as O-acetyltriethyl citrate and O-acetyltributyl citrate; butyl oleate; higher fatty acid ester such as methylacetyl ricinolate and dibutyl sebaceate; and trimetic acid ester.

Applicable anti-degradation agent includes antioxidant, peroxide decomposer, radical inhibitor, metal inactivator, oxygen captor, and amines. The anti-degradation agent is disclosed in, for example, JP-A-3-199201, (the term "JP-A" referred to herein signifies "Japanese Patent Laid-Open No."), JP-A-5-1907073, JP-A-5-194789, JP-A-5-271471, and JP-A-6-107854.

The quantity of other added additive and other thermoplastic resin is in a range of normally from 0 to 20% by weight, preferably from 0 to 10% by weight, and more preferably from 0 to 5% by weight to the quantity of thermoplastic resin.

When thus obtained non-stretched film is continuously and obliquely stretched in an arbitrary angle θ to the width direction of the film, a long stretched film having a delayed-phase axis at the angle θ to the width direction thereof is prepared. That is, by selecting the angle θ arbitrarily, wanted values are obtained, in terms of intraplane refractive index in the delayed-phase axis direction, refractive index in the vertical direction to the intraplane delayed-phase axis, and refractive index in the thickness direction, thus obtaining a ½ wavelength plate which gives a ½ wavelength phase difference to a specified wavelength, and a ¼ wavelength plate which gives a ¼ wavelength phase difference to a specified wavelength.

The method for conducting oblique stretching is not specifically limited, and a known method may be applied, if only the method is the one for continuously stretching the film to angles from 1 to 50 degrees to the width direction thereof and the one for tilting the alignment axis of the polymer to a wanted angle. Examples of the oblique-stretching method applicable to the present invention are the ones disclosed in JP-A-50-83482, JP-A-2-113920, JP-A-3-182701, JP-A-2000-9912, JP-A-2002-86554, and JP-A-2002-22944.

The temperature for conducting oblique-stretching on a non-stretched film is preferably in a range from Tg−30° C. to Tg+60° C., and more preferably from Tg−10° C. to Tg+50° C., (Tg: glass transition temperature of the thermoplastic resin). The stretch rate is normally from 1.01 to 30 fold, preferably from 1.01 to 10 fold, and more preferably from 1.01 to 5 fold.

The thickness of obtained stretched film is normally from 5 to 250 μm, and preferably from 15 to 150 μm.

Although the content of residual volatile component in the stretched film is not specifically limited, the content is preferably 1000 ppm or less, more preferably 500 ppm or less, and most preferably 200 ppm or less. If the content of residual volatile component exceeds 1000 ppm, the volatile component is released outside during use period to induce dimensional changes in the stretched film, thus inducing internal stress. Therefore, when a reflection liquid crystal display unit is applied, for example, irregular display such as local thinning in the black display (giving whitish appearance) may occur. The stretched film having the content of the volatile component within the above-specified range is superior in the stability of optical characteristics such as not-generating irregular display over a long period of use.

Although the saturated water absorption of the stretched film is not specifically limited, preferably the content is 0.01% or less, and more preferably 0.007% or less. If the saturated water absorption exceeds 0.01%, the stretched film may induce dimensional changes depending on the use environment, and internal stress may be generated. When a reflection liquid crystal display unit is applied, for example, irregular display such as local thinning in the black display (giving whitish appearance) may occur. The stretched film having the saturated water absorption within the above-specified range is superior in the stability of optical characteristics such as not-generating irregular display over a long period of use.

(2) Optical Laminate

The optical laminate according to the present invention is a long laminate in which two long phase-difference films are laminated together so that the respective delayed-phase axes thereof cross each other at a specified angle.

The phrase "laminated so that the respective delayed-phase axes cross each other at a specified angle" referred to herein means that the two films are laminated so that the longitudinal direction (or width direction) of each of the two phase-difference films substantially matches with each other. Accordingly, the crossing angle of the delayed-phase axis of each phase-difference film is determined by the stretching direction (oblique direction) in each film. The crossing angle of the delayed-phase axes of the two phase-difference films is (90±10) degrees, preferably (90±5) degrees, and more preferably (90±3) degrees.

According to the optical laminate of the present invention, at least one of the phase-difference films used in manufacturing the optical laminate is preferably prepared by obliquely stretching the thermoplastic resin film obtained by melt-extrusion, and it is much preferable that both of the applied two phase-difference films be prepared by obliquely stretching the thermoplastic resin film by melt-extrusion. It is most preferable that the thermoplastic resin film used for the oblique stretching be made of a polymer resin having an alicyclic structure.

The optical laminate according to the present invention is particularly preferably the one which is prepared by laminating two phase-difference films, treated by obliquely stretching in (45±5) degrees to the width direction thereof, so that the crossing angle of the respective delayed-phase axes thereof becomes (90±10) degrees, where the intraplane refractive index in arbitrary direction on each film is substantially the same with each other, and the refractive index is larger than that in the thickness direction.

With the use of that kind of phase-difference films, the optical laminate having superior optical characteristics is efficiently manufactured.

FIG. 1 shows an example of the optical laminate according to the present invention. A first phase-difference film (F1) which is treated by oblique-stretching to have a delayed-phase axis (p1) at (45±5) degrees to the width direction thereof and a second phase-difference film (F2) which is treated by oblique-stretching to have a delayed-phase axis (p2) at (−45±5) degrees to the width direction thereof are laminated together to form an optical laminate (10). That is, the crossing angle (θ) between the delayed-phase axis (p1) and the delayed-phase axis (p2) necessarily becomes (90±10) degrees.

The optical laminate (10) shown in FIG. 1 may be prepared by the following procedure. First, two long phase-difference films (two coils) are prepared. One of them designates the "first phase-difference film (F1)", while the other film is reversed in the surface thereof to designate the "second phase-difference film (F2)". At that moment, the delayed-phase axis (p2) of the second phase-difference film (F2) is formed at (−45±5) degrees to the width direction thereof.

Then, the first phase-difference film (F1) and the second phase-difference film (F2) are laminated together (while matching the longitudinal direction). By laminating in this manner, the delayed-phase axes (p1 and p2) of both films cross substantially perpendicularly with each other in an intraplane direction, (crossing angle θ=90±10 degrees), thus obtaining a long optical laminate which functions as a negative retarder.

The method for laminating the first phase-difference film (F1) and the second phase-difference film (F2) is not specifically limited, and a known method can be adopted. From the point of production efficiency, it is preferable to adopt a method for laminating long films together, or what is called the "roll-to-roll method".

According to the "roll-to-roll method", each of the coiled first phase-difference film (F1) and the coiled second phase-difference film (F2) is drawn out, and an adhesive or a bond is applied onto the laminating face of the respective films, then they are laminated together, which are then fed to a nip of pressing roller to clad them together to continuously stick them with each other.

The adhesive and the bond to stick the films are not specifically limited if only they have wanted adhesion force and they have high transparency. From the point of preventing changes in optical characteristics of the structuring members, the adhesive and the bond are preferably the ones which do not need elevated temperature processing during curing and drying, and preferably do not need a long time for curing and drying. Examples of the adhesive and bond are those of acrylic resin-base. The thickness of thus obtained optical laminate is normally in a range from 10 to 500 μm, and preferably from 30 to 300 μm.

The prepared long optical laminate may be coiled to collect and store. On assembling the long optical laminate to a display unit or the like, the coiled film is cut to a necessary size, or at an arbitrary angle to the width direction or longitudinal direction thereof, at need, or normally cut to a rectangular shape.

2) Optical Element

The optical element according to the present invention is formed by laminating the optical laminate of the present invention on one surface of a polarization film.

The polarization film used in the optical element according to the present invention is not specifically limited, and a known method can be applied. For example, an iodine-base polarization film, a dye-base polarization film using dichromatic dye, and polyene-base polarization film are applicable. Among these polarization films, the iodine-base polarization film and the dye-base polarization film, for example, are generally prepared by stretching a polyvinylalcohol-base film and then by letting the film absorb iodine or a dichromatic dye.

Since the polarization film is generally thin and has poor strength, sole polarization film is difficult to be subjected to post-treatment including coiling. Accordingly, a protective film has to be laminated on both surfaces of the polarization film to improve the mechanical strength and the heat resistance thereof and to protect the film from humidity and other external disturbances.

To the contrary, the present invention uses a long optical laminate so that the polarization film can be directly laminated on one surface of the optical laminate via an adhesive layer. That is, a sheet of protective film is eliminated to increase the production efficiency and to decrease the number of production steps. For example, there is provided a single-line process in which a polyvinylalcohol film is stretched, and iodine is adsorbed onto the film, then the long optical laminate which also functions as the protective film is laminated (stuck) thereto, and the laminate is dried and coiled. It is also possible to laminate the protective film between the optical laminate and the polarization film.

Figure 2:
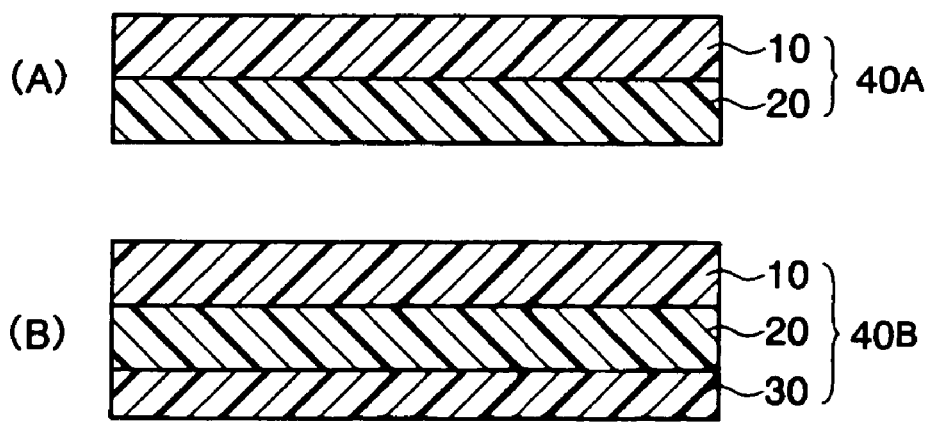
FIG. 2 shows a cross-sectional view of layer structure as an example of the optical element according to the present invention.

FIG. 2(A) shows the layer structure of thus obtained optical element (40A). The optical laminate (10) is stuck on one surface of a polarization film (20) via an adhesive layer or bond layer (not shown).

The optical element according to the present invention is preferably an optical element (40B) structured by laminating the optical laminate (10) according to the present invention on one surface of the polarization film (20), while laminating a protective film (30) on the other surface thereof, which is shown in FIG. 2(B). By laminating the protective film on the other surface of the polarization film, (on the surface where no optical laminate is laminated), the mechanical strength and the heat resistance of the polarization film are increased, and the polarization film is protected from humidity and other external disturbances. When the polarization film is structured by a polyvinylalcohol with adsorbed iodine thereto, the sublimation of iodine is prevented. The protective film may be formed in a form of resin-coating layer, a resin-film laminate layer, or the like.

3) Broad-band ¼ Wavelength Plate

The broad-band ¼ wavelength plate according to the present invention provides substantially ¼ wavelength phase-difference in a wide wavelength range (for example, 450 to 650 nm). The broad-band ¼ wavelength plate according to the present invention is a long optical laminate prepared by laminating long phase-difference films treated by oblique-stretching, (a ½ wavelength plate and a ¼ wavelength plate), so that the respective delayed axes thereof cross each other at (60±3) degrees.

For the case that the ½ wavelength plate and the ¼ wavelength plate are laminated, if the respective delayed axes thereof cross each other at smaller than 57 degrees (or (60−3) degrees) or at larger than 63 degrees (or (60+3) degrees), the obtained long optical laminate cannot function as the "broad-band ¼ wavelength plate". If the sticking is given so that the respective delayed axes of the ½ wavelength plate and the ¼ wavelength plate cross each other at (60±3) degrees, the long broad-band ¼ wavelength plate cannot be obtained unless the respective longitudinal directions substantially match with each other.

In the broad-band ¼ wavelength plate according to the present invention, it is preferable that at least one of the phase-difference films structuring the ½ wavelength plate and the ¼ wavelength plate contain 1000 ppm or less of residual volatile component, and it is much preferable that both of the phase-difference films structuring the ½ wavelength plate and the ¼ wavelength plate contain 1000 ppm or less of residual volatile component. If the content of residual volatile component exceeds 1000 ppm, the volatile component is released outside during the use period to induce dimensional changes in the stretched films (½ wavelength plate and/or ¼ wavelength film), thus generating internal stress. Therefore, if the phase-difference films containing more than 1000 ppm are applied to a reflection liquid crystal display unit, for example, irregular display such as local thinning in the black display (giving whitish appearance) may occur. The broad-band ¼ wavelength plate having the content of the volatile component within the above-specified range in the applied phase-difference films is superior in the stability of optical characteristics such as not-generating irregular display over a long period of use.

Figure 3:
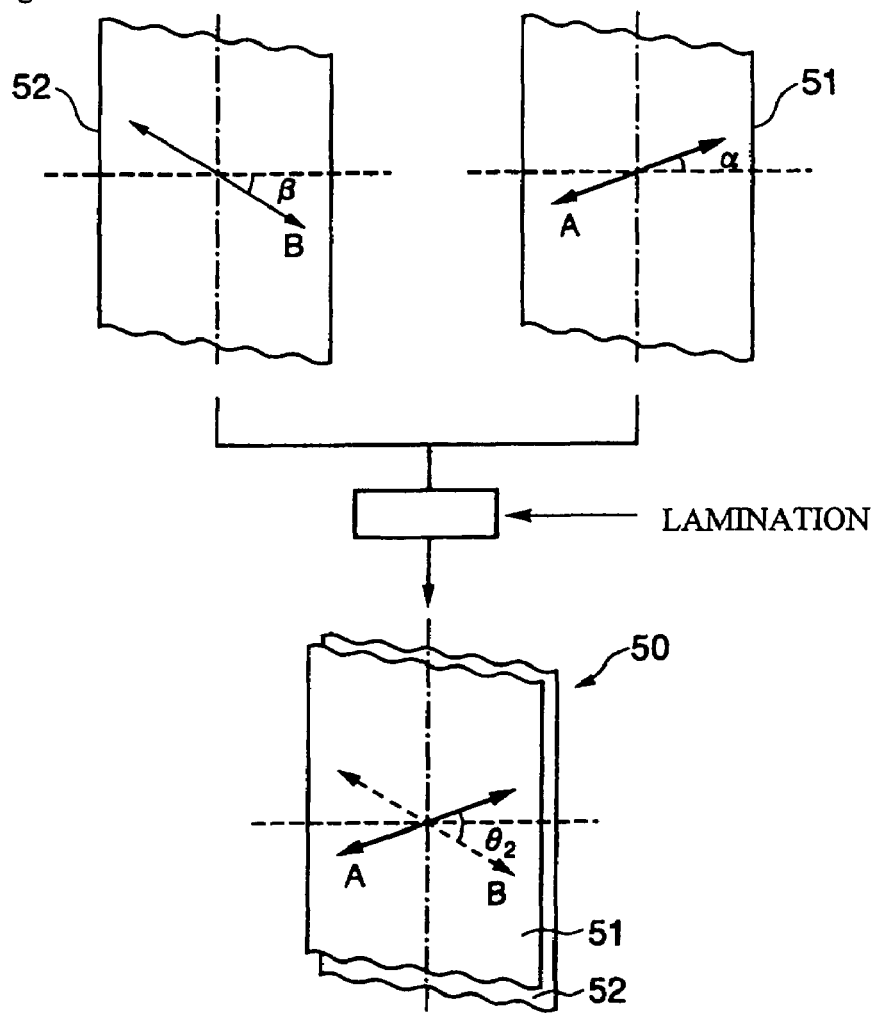
FIG. 3 is a schematic drawing illustrating a part of the manufacturing process, (sticking), of the broad-band ¼ wavelength plate according to the present invention.

FIG. 3 shows an example of structure of broad-band ¼ wavelength plate according to the present invention. The broad-band ¼ wavelength plate (50) shown in FIG. 3 is prepared by laminating a long ½ wavelength plate (51) having a delayed-phase axis in the arrow A direction by the oblique-stretching and a long ¼ wavelength plate (52) having a delayed-phase axis in the arrow B direction by the oblique-stretching together so that the respective delayed-phase axes thereof cross each other at a specified angle ($\theta_2$). On each of the ½ wavelength plate and the ¼ wavelength plate, the angle between the width direction and the delayed-phase axis is adequately adjustable by controlling the treatment condition of oblique-stretching.

As for the ½ wavelength plate structuring the broad-band ¼ wavelength plate according to the present invention, the angle between the width direction and the delayed-phase axis, (acute angle section), is adjusted to a range from 15 to 45 degrees, and the angle ($\alpha$) between the width direction and the delayed-phase axis of the ½ wavelength plate (51) shown in FIG. 3 is adjusted to 15 degrees. Regarding the ¼ wavelength plate, the angle between the width direction and the delayed-phase axis, (acute angle section), is adjusted to a range from 15 to 45 degrees, and the angle ($\beta$) between the width direction and the delayed-phase axis of the ¼ wavelength plate (52) shown in FIG. 3 is adjusted to 45 degrees.

The broad-band ¼ wavelength plate according to the present invention is preferably prepared by the steps of: forming a long resin film using the melt-extrusion method or the like, (film-forming step); forming a ½ wavelength plate and a ¼ wavelength plate made of long phase-difference film, respectively, by applying oblique-stretching to thus obtained resin film, (stretching step); and sticking the ½ wavelength plate and the ¼ wavelength plate together, (laminating step)

In the "film-forming step", adoption of the melt-extrusion method using a thermoplastic resin is preferable from the point of readily forming a long resin film, and it is much preferable that the thermoplastic resin be made of a polymer resin having an alicyclic structure. In the "stretching step", the long resin film is obliquely stretched. The method of oblique-stretching is not specifically limited, and a known method is applicable as described before. Through the stretching step, a phase-difference film having angles ranging from 15 to 45 degrees to the film width direction, (½ wavelength plate), and a phase-difference film having angles ranging from 15 to 45 degrees to the film width direction, (¼ wavelength plate), are obtained. Thus obtained long phase-difference films (½ wavelength plate and ¼ wavelength plate) are coiled, respectively, and can be collected to store.

In the "laminating step", the long ½ wavelength plate and the long ¼ wavelength plate are laminated together so that the respective delayed-phase axes thereof cross each other at (60±3) degrees. The method of laminating the ½ wavelength plate and the long ¼ wavelength plate is not specifically limited, and a known lamination method is applicable. It is, however, preferable to adopt the roll-to-roll method having high production efficiency. According to the "roll-to-roll method", each of the coiled ½ wavelength plate and the ¼ wavelength plate is drawn out, and an adhesive or a bond is applied onto the laminating face of the respective plates, then they are laminated together, which are then fed to a nip of pressing roller to stick them with each other continuously. Thus obtained long broad-band ¼ wavelength plate is coiled, and can be collected to store. On assembling the coiled long broad-band ¼ wavelength plate to a display unit or the like, the coiled film is cut to an arbitrary size, or at an arbitrary angle to the width direction or longitudinal direction thereof, at need, or normally cut to a rectangular shape.

The broad-band ¼ wavelength plate according to the present invention provides a phase-difference of ¼ wavelength in a wide wavelength range (for example, 450 to 650 nm). For the broad-band ¼ wavelength plate according to the present invention, the Re/$\lambda$ value in the above-given wavelength range is preferably from 0.24 to 0.26.

4) Optical Product Member

An optical member according to the present invention has a circularly polarized light separating layer made of a cholesteric liquid crystal being laminated on one surface of the broad-band ¼ wavelength plate according to the present invention. The optical member of the present invention improves the luminance of a reflection liquid crystal display unit equipped therewith.

Figure 4:
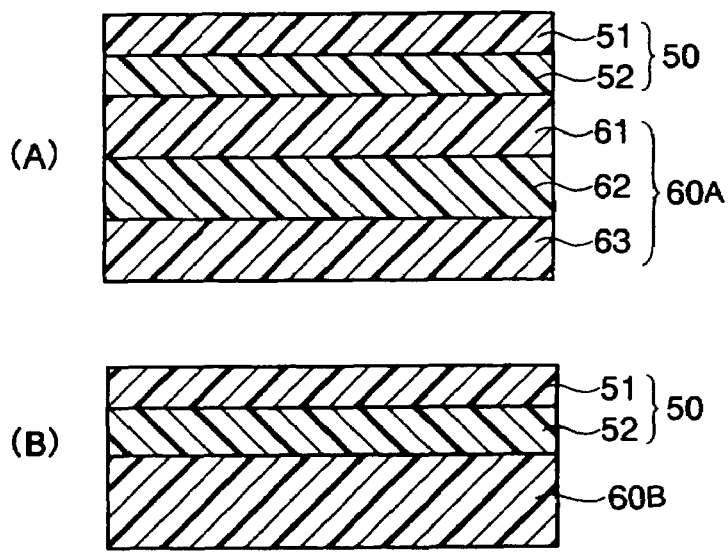
FIG. 4 shows a cross-sectional view of layer structure as an example of the optical member according to the present invention.

FIG. 4(A) shows an example of the optical member according to the present invention. The optical member shown in FIG. 4(A) structures a circularly polarized light separating layer (60A) by laminating a first circularly polarized light separating layer (61), a second circularly polarized light separating layer (62), and a third circularly polarized light separating layer (63) on one surface of the broad-band ¼ wavelength plate (50) having the layer structure shown in FIG. 3.

The first circularly polarized light separating layer (61), the second circularly polarized light separating layer (62), and the third circularly polarized light separating layer (63) are structured by cholesteric liquid crystals having different spiral pitch (selected wavelength range), respectively. By laminating them together to form a three-layer structure, the circularly polarized light separating function is generated in the whole range of visible light. That is, the first circularly polarized light separating layer (61) reflects left (or right) circular polarized light in the near-red wavelength light, and functions as a red-reflection layer which transmits right (or left) circular polarized light. The second circularly polarized light separating layer (62) reflects left (or right) circular polarized light in the near-green wavelength light, and functions as a green-reflection layer which transmits right (or left) circular polarized light. The third circularly polarized light separating layer (63) reflects left (or right) circular polarization light in the near-blue wavelength light, and functions as a blue-reflection layer which transmits right (or left) circular polarization light.

FIG. 4(B) shows another example of the optical member according to the present invention. The optical member shown in FIG. 4(B) is prepared by laminating a circularly polarized light separating layer (60B) made of a cholesteric liquid crystal on one surface of the broad-band ¼ wavelength plate (50) having the layer structure shown in FIG. 3.

The circularly polarized light separating layer (60B) reflects left (or right) circular polarization light in the visible wavelength light, and functions as a white-reflection layer which transmits right (or left) circular polarization light. Inside the circularly polarized light separating layer (60B), the spiral pitch of the cholesteric liquid crystal structuring the layer (60B) shows a gradient change in the thickness direction of the layer, thus providing the circularly polarized light separating function over the whole range of visible light in spite of being a single layer.

The circularly polarized light separating layer (60B) may be prepared by the steps given below. To a liquid crystal layer containing a compound which is isomerized to become an agent to form chiral compound under the irradiation of specific wavelength of ultraviolet light, a liquid crystal, and an ultraviolet light absorbent, a specified wavelength ultraviolet light is irradiated on one surface thereof so that the intensity of irradiated light is continuously decreased from the irradiated surface to the opposite surface, thus to vary the isomerization rate of the compound (or the quantity of existing agent to form chiral compound), or to vary the spiral pitch of the liquid crystal in the thickness direction thereof. Then, to fix the condition (gradient change in the spiral pitch), ultraviolet light having a different wavelength from that of the above-described ultraviolet light having the specific wavelength is irradiated against the liquid crystal layer to harden the whole liquid crystal layer.

5) Broad-band Circular Polarization Element

The broad-band circular polarization element according to the present invention is prepared by laminating a linear polarization element on one surface of the broad-band ¼ wavelength plate according to the present invention.

Figure 5:
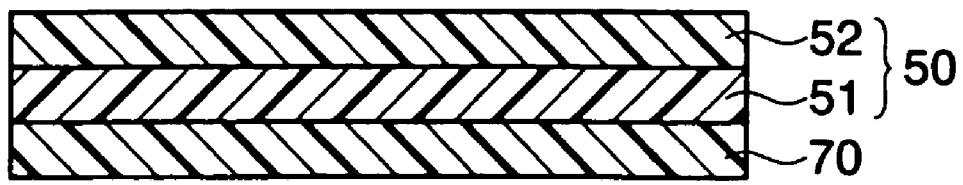
FIG. 5 shows across-sectional view of layer structure as an example of the broad-band circular polarization element according to the present invention.

FIG. 5 shows an example of the broad-band circular polarization element according to the present invention. The broad-band circular polarization element given in FIG. 5 is prepared by laminating a linear polarization element (70) on one surface (½ wavelength plate side) of the broad-band ¼ wavelength plate (50) having the layer structure shown in FIG. 3. The applied linear polarization element is not specifically limited, and a known one can be applied.

The broad-band ¼ wavelength plate according to the present invention and the linear polarization element are required to satisfy the condition that the angle between the delayed-phase axis of the ½ wavelength plate structuring the former and the polarization-transmission axis of the latter is (15±3) degrees, and that the angle between the delayed-phase axis of the ¼ wavelength plate structuring the former and the polarization-transmission axis of the latter is (75±3) degrees. The broad-band ¼ wavelength plate according to the present invention is a long optical laminate, and the delayed-phase axis of the ½ wavelength plate structuring the broad-band ¼ wavelength plate has a specified angle (15 to 45 degrees) to the width direction thereof (or matching with the direction of width of the broad-band ¼ wavelength plate). As a result, by laminating with the long linear polarization element, a long broad-band circular polarization element is obtained.

6) Optical Product

The broad-band circular polarization element according to the present invention can be used as an anti-reflection layer of various optical products. Preferred examples of the optical product are a reflection liquid crystal display unit, touch panel, and electro-luminescence display unit.

Figure 6:
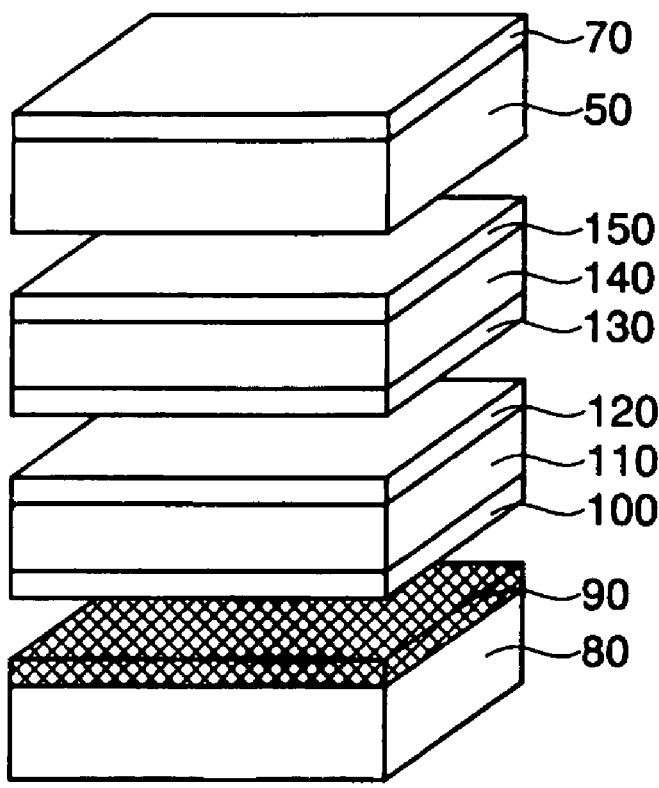
FIG. 6 shows a cross-sectional view of layer structure as an example of the reflection liquid crystal display unit according to the present invention.

FIG. 6 shows an example of layer structure of a reflection liquid crystal display unit having the broad-band circular polarization element according to the present invention. The reflection liquid crystal display unit given in FIG. 6 has layered components of, from bottom to top, a lower substrate (80), a reflection electrode (90), a lower aligned film (100), a liquid crystal layer (110), an upper aligned film (120), a transparent electrode (130), an upper substrate (140), a transparent conductive film (150), the broad-band ¼ wavelength plate (50), and the linear polarization element (70). The lower substrate (80) and the reflection electrode (90) form the reflection plate. The components from the lower aligned film (100) to the upper aligned film (120) form the liquid crystal cell. The broad-band ¼ wavelength plate (50) and the linear polarization element (70) form the broad-band circular polarization element.

In the case of color display, a color-filter layer is further added. FIG. 6 does not show the color-filter layer. The color-filter layer is preferably positioned between the reflection electrode (90) and the lower aligned film (100), or between the upper aligned film (120) and the transparent electrode (130).

In the reflection liquid crystal display unit given in FIG. 6, a reflection plate may be added using a transparent electrode instead of the reflection electrode (90). The reflection plate used in combination with the transparent electrode is preferably a metallic plate. If the surface of the reflection plate is smooth, only the regular reflection component is reflected to narrow the angle of visibility, in some cases. Therefore, it is preferable that the surface of the reflection plate has an irregularity (disclosed in Japanese Patent No. 275620, for example). If the surface of the reflection plate is smooth, a light-diffusion film may be attached to one surface (at the cell side or at outside) of the polarization element (instead of giving irregularity on the surface).

The applied liquid crystal mode is not specifically limited. Examples of applicable liquid crystal mode are Twisted Nematic (TN) type, Super Twisted Nematic (STN) type, and Hybrid Aligned Nematic (HAN) type.

The reflection liquid crystal display unit having the broad-band circular polarization element according to the present invention may be used in "normally-white mode" which gives bright display under low applied voltage and gives dark display under high applied voltage, or in "normally-black mode" which gives dark display under low applied voltage and gives bright display under high applied voltage.

The touch panel which uses the broad-band circular polarization element according to the present invention as the anti-reflection layer may have a structure of, from the side of input operation on the touch panel, the broad-band circular polarization element, an upper conductive film, a spacer, and a lower conductive film. The upper conductive film may be formed directly on the substrate of, for example, polymer film in optically isotropic state, or at need, on the substrate via an adhesive layer, a protective layer of the substrate, or the like.

The touch panel has several types depending on the detection method, including a resistance-film touch panel, optical touch panel, ultrasonic touch panel, and capacitance touch panel. Any type of them may be applied. Among them, a touch panel having an interface between the transparent conductive film and the gap, for example, the resistance-film touch panel, is specifically preferable. The resistance-film touch panel has a structure in which the two transparent electrode substrates, each of which has transparent conductive film on at least one surface thereof, are placed so that the respective transparent conductive films face each other, and the two conductive substrates are brought to contact with each other by pressing the upper transparent electrode substrate, thus detecting the position.

The touch panel having the broad-band circular polarization element according to the present invention can be used in combination with various display units such as a cathode ray tube (CRT), plasma display (PDP), field-emission display (FED), inorganic EL device, organic EL device, and liquid crystal display unit.

Figure 7:
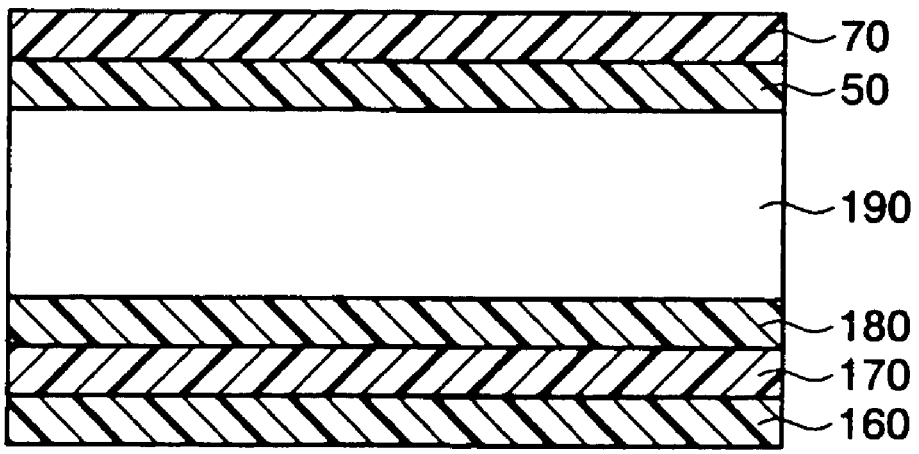
FIG. 7 shows a cross-sectional view of layer structure as an example of the electro-luminescence display unit according to the present invention.

FIG. 7 shows an example of layer structure of an electro-luminescence display unit having the broad-band circular polarization element according to the present invention. The electro-luminescence display unit given in FIG. 7 has the structure of a light-reflection electrode (160), a light-emission layer (170), a transparent electrode (180), a transparent substrate (190), the broad-band ¼ wavelength plate (50), and the linear polarization film (70), laminated in this order. The display unit given in FIG. 7 structures the broad-band circular polarization element by the broad-band ¼ wavelength plate (50) and the linear polarization film (70).

EXAMPLES

The present invention is described in more detail in the following referring to Manufacturing Examples, Examples according to the present invention, and Comparative Examples. The unit "parts" and "%" referred to in the Examples is on the weight basis unless otherwise noted. The present invention is, however, not limited to the Manufacturing Examples and Examples given below.

The physical properties were determined in accordance with the respective procedures described below.

(1) Molecular Weight

Cyclohexane was adopted as the solvent. Gel-permeation chromatography (GPC) was applied to determine the weight average molecular weight (Mw) converted to the standard polystyrene.

(2) Molecular Weight Distribution

Cyclohexane was adopted as the solvent, and GPC was applied to determine the weight average molecular weight (Mw) and the number average molecular weight (Mn) converted to the standard polystyrene. Then, the ratio of the weight average molecular weight (Mw) to the number average molecular weight (Mn), (Mw)/(Mn), was calculated.

(3) Glass Transition Temperature (Tg)

The glass transition temperature (Tg) was determined by DSC conforming to JIS K7121.

(4) Hydrogenation Rate

The hydrogenation rate (%) of the main chain and aromatic ring in the polymer was derived from the $^1$H-NMR determination.

(5) Determination of the Content of Residual Volatile Component

The content of residual volatile component in the film was quantified by determining the content of the component of 200 or smaller molecular weight by gas chromatography.

(6) Film Thickness

The film thickness was determined by an off-line thickness tester (Model TOF-4R, manufactured by Yamabun Electronics Co., Ltd.)

(7) Determination of Saturated Water Absorption

The saturated water absorption of a stretched film was determined conforming to JIS K7209.

(8) Determination of Retardation Value (Re)

The determination was conducted using KOBRA-21AADH manufactured by Oji Scientific Instruments Co., Ltd.

Manufacturing Example 1

Under a nitrogen atmosphere, 500 parts of dehydrated cyclohexane, 0.82 parts of 1-hexene, 0.15 parts of dibutylether, and 0.30 parts of tri-isobutylaluminum were poured in a reactor to mix them together at room temperature. While keeping the temperature of the mixture to 45° C., there were added continuously for two hours a norbornene-base monomer mixture consisting of 80 parts of tricyclo[4,3,0,1$^{2,5}$] deca-3,7-diene (dicyclopentadiene, (hereinafter referred to simply as DCP)), 70 parts of 7,8-benzotricyclo[4,4,0,1$^{2,5}$, 1$^{7,10}$]deca-3-ene (methanotetrahydrofluorene, (hereinafter referred to simply as MTF)), and tetracyclo[4,4,0,1$^{2,5}$,1$^{7,10}$] dodeca-3-ene (tetracyclododecene, (hereinafter referred to simply as TCD)), and 40 parts of tungsten hexachloride (0.7% toluene solution), thus executed polymerization. To the polymerized solution, 1.06 parts of butylglycidylether and 0.52 parts of isopropyl alcohol were added to inactivate the polymerization catalyst to stop the polymerization reaction.

To 100 parts aliquot of thus obtained reacted solution containing the ring-opening polymer, 270 parts of cyclohexane were added, and further 5 parts of nickel-alumina catalyst (manufactured by Nikki Chemical Co., Ltd.) as the hydrogenation catalyst were added. The mixture was pressurized to 5 MPa by hydrogen, which was then heated to 200° C. under agitation, thus executing the reaction for 4 hours to obtain the reacted solution which contained 20% of polymer of DCP/MTF/TCD ring-opening polymer hydride. After separating the hydrogenation catalyst by filtering the reacted solution, an antioxidant (trade name: Irganox 1010, manufactured by CIBA Specialty Chemicals, Inc.) was added to the solution to dissolve therein, (the added quantity of the antioxidant was 0.1 parts per 100 parts of polymer.)

Using a cylindrical concentration-drying apparatus (manufactured by Hitachi, Ltd.), cyclohexane which was the solvent, and other volatile components were removed from the solution at 270° C. of temperature under not higher than 1 kPa of pressure to obtain a ring-opening polymer hydride (hydrogenated polymer).

The rate of copolymerization of each norbornene-base monomer in the obtained hydrogenated polymer was calculated based on the composition of residual norbornenes in the solution after the polymerization, (by gas chromatography) The result was DCP/MTF/TCD=40/25/35, which is almost equal to the feed composition. The weight average molecular weight (Mw) of the hydrogenated polymer was 35,000, the molecular weight distribution thereof was 2.1, the hydrogenation rate was 99.9%, and Tg was 134° C.

Manufacturing Example 2

The pellets obtained in Manufacturing Example 1 were dried in a hot-air drier with streaming hot air at 70° C. for 2 hours. The dried pellets were fed to a T-die film melt-extruder having a resin melting and kneading machine provided with a 65 mm size screw, thus formed an extrusion film having 100 μm of thickness under the condition of 240° C. of molten resin temperature and 500 mm of T-die width.

Example 1

Manufacture of Optical Laminate

Figure 9:
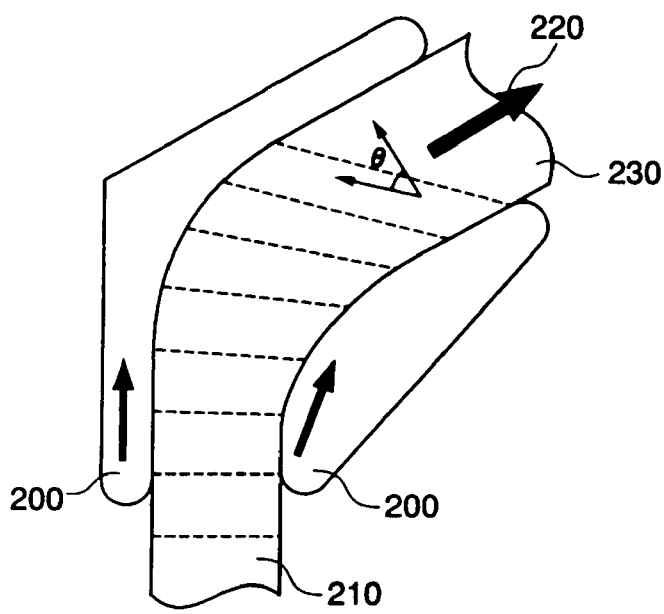
FIG. 9 shows a conceptual drawing of a tenter-stretching machine which executes oblique-stretching of film by moving the left and right tenter clips at an equal speed with each other, and by bending the film travel passage while stretching the film in the width direction thereof.

The film obtained in Manufacturing Example 2 was heated to 135° C., and was fed to the tenter-stretching machine shown in FIG. 9 to conduct continuous oblique-stretching thereto, thus obtained long stretched film having a stretch rate of 1.3 fold and an angle of delayed-phase axis to the width direction of the film of average 45 degrees. The tenter-stretching machine shown in FIG. 9 conducts oblique-stretching of film by moving left and right tenter clips (200) at an equal speed with each other, and by bending a film travel passage (220) while stretching a film (210) in the width direction thereof. The tenter-stretching machine provides a stretched film (230) having an angle θ (45 degrees in this case) between the delayed-phase axis and the film width direction.

The thickness, the content of volatile component, and the saturated water absorption of thus obtained stretched film were determined using the above-described respective methods to give 75 μm, 100 ppm or less, and 0.007%, respectively. The film was a phase-difference film having the delayed-phase axis at 45 degrees to the axial direction thereof.

Two sheets of the phase-difference film were prepared. One of them was defined as the first phase-difference film (F1) which had a delayed-phase axis substantially at +45 degrees to the width direction thereof. The other was reversed in the surface thereof to define as the second phase-difference film (F2) which had a delayed-phase axis substantially at −45 degrees to the width direction thereof.

The first phase-difference film (F1) and the second phase-difference film (F2) were layered with each other so that the respective longitudinal directions thereof match each other, (so that the crossing angle of the delayed-phase axes becomes substantially 90 degrees), via an adhesive layer using an polyurethane-base adhesive. Thus layered films were fed to a nip of a pressing roller to clad them together to continuously stick them with each other to manufacture the long optical laminate.

Figure 8:
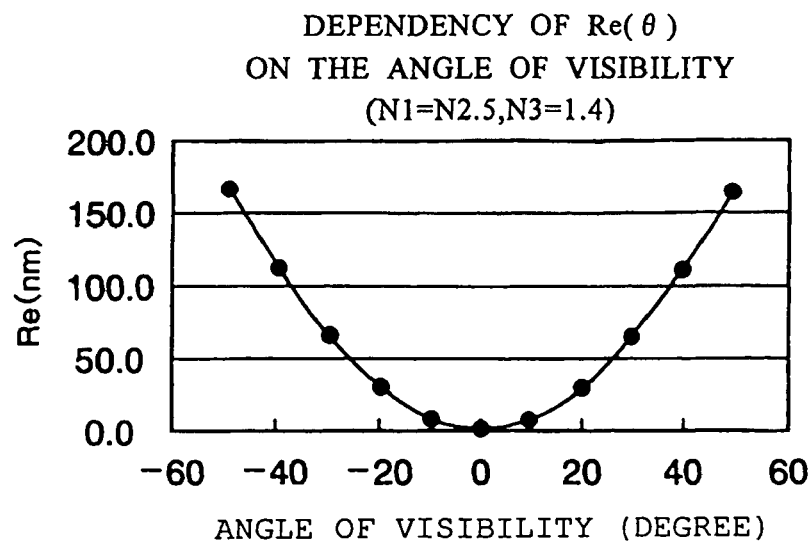
FIG. 8 is a graph showing the characteristics of angle of visibility for the optical laminate according to Example 1.

On the obtained optical laminate, the intraplane refractive index (N1) in the delayed-phase axis (p1) direction and the intraplane refractive index (N2) in the delayed-phase axis (p2) direction was 1.5 for both thereof, and the refractive index (N3) in the thickness direction was 1.4. FIG. 8 shows the characteristics of angle of visibility determined on the obtained optical laminate, (measurement wavelength=550 nm). From the result shown in FIG. 8, the optical laminate of Example 1 was proved to be suitable for the negative retarder.

Example 2

Manufacturing Broad-band ¼ Wavelength Plate (C)

The film obtained in Manufacturing Example 2 was heated to 135° C., and was fed to a tenter-stretching machine similar to the stretching machine shown in FIG. 9 to conduct continuous oblique-stretching thereto, thus obtained a long ½ wavelength plate (A) having an angle of the delayed-phase axis to the width direction of the film of 30 degrees, and giving a retardation value [Re (550)] of 265 nm at 550 nm wavelength. With a similar procedure, a long ¼ wavelength plate (B) having an angle of the delayed-phase axis to the width direction of the film of 30 degrees, and giving the retardation value [Re (550)] of 132.5 nm at 440 nm wavelength was prepared.

The thickness, the content of volatile component, and the saturated water absorption of each of the wavelength plate (A) and the wavelength plate (B) were found to be 75 μm, 0.01% or less, and 0.007%, respectively, by the above-described respective methods. The retardation value [Re (550)] of the wavelength plate (A) and of the wavelength plate (B) at 550 nm of wavelength was 265 nm and 132.5 nm, respectively, and the ratio of the retardation value [Re (450)] at 450 nm of wavelength to the retardation value [Re (550)], [Re(450)/Re(550)], for the wavelength plate (A) and the wavelength plate (B) was 1.0051 for both thereof.

Then, the wavelength plate (A) on which the adhesive was applied as above-described was defined as "the first phase-difference film (F1)" having the delayed-phase axis (p1) in the direction substantially at +30 degrees to the width direction thereof. The wavelength plate (B) was then reversed in the surface thereof, which reversed wavelength plate was defined as "the second phase-difference film (F2)" having the delayed-phase axis (p2) in the direction of substantially −30 degrees to the width direction thereof.

The coiled ½ wavelength plate (A) and the coiled ¼ wavelength plate (B) were drawn out, respectively, which were layered with each other via an acrylic-base adhesive layer (D) so that the respective delayed-phase axes thereof cross each other at 60 degrees of angle. Then they are fed to a nip of pressing roller to clad them together to continuously stick them with each other, thus manufactured the broad-band ¼ wavelength plate (C), according to the present invention, made of a long optical laminate.

The obtained broad-band ¼ wavelength plate (C) gave the retardation value of 266 nm (Re/λ≈0.25) at a wavelength of 450 nm, the retardation value of 265 nm (Re/λ≈0.25) at a wavelength of 550 nm, and the retardation value of 267 nm (Re/λ≈0.25) at wavelength of 650 nm, providing the ¼ wavelength phase-difference over a wide wavelength range.

Example 3

Manufacturing Broad-band Circular Polarization Element

Figure 10:
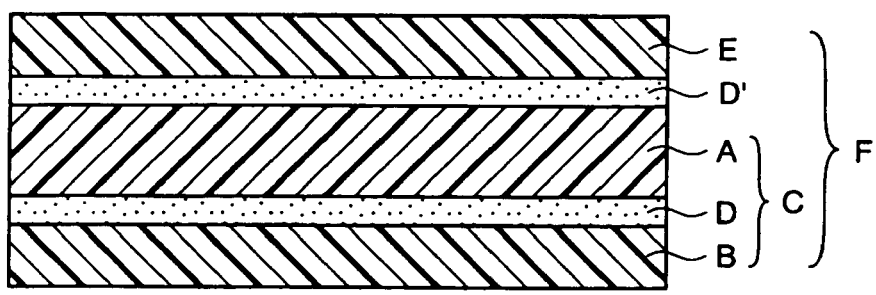
FIG. 10 shows a cross-sectional view of layer structure of the reflection liquid crystal display unit according to Example 1.

The broad-band ¼ wavelength plate (C) obtained in the above-given procedure was cut to prepare a small piece, which was then stuck to a linear polarization plate (E) via an acrylic-base adhesive layer (D') to form a broad-band circular polarization element (F). On sticking them together, the polarization axis of the linear polarization plate and the delayed-phase axis of the ½ wavelength plate structuring the (C) were adjusted to cross each other at 15 degrees. The ½ wavelength plate side of (C) was stuck to the linear polarization plate. FIG. 10 shows thus obtained structure of the lamination of the prepared broad-band circular polarization element (F). With the use of the prepared broad-band circular polarization element (F), circular polarization is obtained in a wide wavelength range (450 to 650 nm).

Example 4

Manufacturing Reflection Liquid Crystal Display Unit

The broad-band circular polarization element (F) prepared in the above-procedure was placed on a liquid crystal display element having a reflection plate on the rear surface thereof so that the ¼ wavelength plate (B) faces the liquid crystal display element, thus manufactured the reflection liquid crystal display unit. The manufactured reflection liquid crystal display unit was evaluated in terms of optical performance and durability. The evaluation method is described below.

Each of the two liquid crystal elements having the broad-band circular polarization element (F) after the evaluation of the optical performance thereof in the above-procedure was allowed to stand under the respective environments given below.

Environment (I): Allowed to stand for 30 days under an environment of 25° C. and 40% RH Environment (II): Allowed to stand for 30 days under an environment of 25° C. and 80% RH Each of the circular polarization elements allowed to stand in each environment was observed to evaluate the black display through the element. For both cases, no change appeared in the uniformity of black display and in the tone, giving a favorable evaluation result.

INDUSTRIAL APPLICABILITY

The present invention provides a long optical laminate which has excellent stability of optical characteristics and which is able to be manufactured by the roll-to-roll method with high production efficiency. The optical laminate according to the present invention is possible to stick to a long work (polarization element). An optical element having the optical laminate is manufactured at high efficiency.

The present invention gives a ¼ wavelength phase-difference in a wide wavelength range, and provides a long broad-band ¼ wavelength plate which is able to be manufactured by the roll-to-roll method with high production efficiency, and which allows effective use of raw materials.

The present invention provides a long optical element having a long ¼ wavelength plate and giving excellent production efficiency.

A touch panel, reflection liquid crystal display unit, and electro-luminescence display unit, which have the broad-band circular polarization element according to the present invention, give excellent durability and do not induce irregular display over a long period of use.

The invention claimed is:

1. An optical laminate with a long size, comprising two obliquely stretched long phase-difference films being laminated together so that the respective delayed-phase axes thereof cross each other at a specified angle, at least one of the two phase-difference films being formed of a resin containing 10% by weight or more of a repeating unit having a tricyclo[4.3.0.1$^{2,5}$]decane-7,9-diyl-ethylene structure and/or a resin containing 55 to 90% by weight of a repeating unit-having a bicyclo[3.3.0]octane-2,4-diyl-ethylene structure, and containing a residual volatile component by not more than 1000 ppm, wherein said two phase-difference films being obliquely stretched at an angle of (45±5) degrees to the width direction, and being laminated together so that the respective delayed-phase axes thereof cross each other at an angle of (90±10) degrees, an intraplane refractive index in an arbitrary direction on each film being substantially the same with each other, and the refractive index being larger than the refractive index in the thickness direction.

2. The optical laminate as in claim 1, wherein at least one of the two phase-difference films is a film obtained by obliquely stretching a thermoplastic resin film prepared by melt-extrusion.

3. An optical element with a long size comprising the optical laminate according to claim 1 being laminated on one surface of a polarization film.

4. The optical element as in claim 3, further comprising a protective film being laminated on other surface of the polarization film.

5. A broad-band ¼ wavelength plate with a long size, comprising: a long ½ wavelength plate comprising a phase-difference film treated by obliquely stretching so that an angle between the width direction thereof and a delayed-phase axis thereof is adjusted to become in a range from 15 to 45 degrees; and a long ¼ wavelength plate comprising a phase-difference film treated by obliquely stretching so that an angle between the width direction thereof and a delayed-phase axis thereof is adjusted to become in a range from 15 to 45 degrees being laminated on the long ½ wavelength plate so that the delayed-phase axis of the ¼ wavelength plate crosses the delayed-phase axis of the ½ wavelength plate at an angle of (60±3) degrees with each other; at least one of the two phase-difference films forming at least one of the ½ wavelength plate or ¼ wavelength plate being foamed of a resin containing 10% by weight or more of a repeating unit having tricyclo[4.3.0.1$^{2,5}$]decane-7,9-diyl-ethylene structure and/or a resin containing 55 to 90% by weight of a repeating unit-having, a bicyclo[3.3.0]octane-2,4-diyl-ethylene structure, and containing a residual volatile component by not more than 1000 ppm.

6. The broad-band ¼ wavelength plate as in claim 5, wherein the phase-difference film structuring at least one of the ½ wavelength plate and the ¼ wavelength plate is a film obtained by obliquely stretching a thermoplastic resin film prepared by melt-extrusion.

7. An optical member comprising a circularly polarized light separating layer made of a cholesteric liquid crystal being laminated on one surface of the broad-band ¼ wavelength plate according to any of claim 5 or 6.

8. A broad-band circular polarization element comprising a linear polarization element being laminated on one surface of a broad-band ¼ wavelength plate, wherein the broad-band ¼ wavelength plate comprises: a long ½ wavelength plate comprising a phase-difference film treated by obliquely stretching so that an angle between the width direction thereof and a delayed-phase axis thereof is adjusted to become in a range from 15 to 45 degrees; and a long ¼ wavelength plate comprising a phase-difference film treated by obliquely stretching so that an angle between the width direction thereof and a delayed-phase axis thereof is adjusted to become in a range from 15 to 45 degrees being laminated on the long ½ wavelength plate so the delayed phase axis of the ¼ wavelength plate crosses the delayed-phase axis of the ½ wavelength plate at an angle of (60±3) degrees with each other, wherein at least one of the two phase-difference films forming at least one of the ½ wavelength plate or ¼ wavelength plate containing a residual volatile component by not more than 1000 ppm, and wherein an angle between a polarization-transmission axis of the linear polarization element and the delayed-phase axis of the ½ wavelength plate forming the broad-band ¼ wavelength plate being (15±3) degrees.

9. An optical product comprising the broad-band circular polarization element according to claim 8.

10. The optical product as in claim 9 being a reflection liquid crystal display unit.

11. The optical product as in claim 9 being a touch panel.

12. The optical product as in claim 9 being an electro-luminescence display unit.

13. The broad-band circular polarization element as in claim 8, wherein the phase-difference film forming at least one of the ½ wavelength plate and the ¼ wavelength plate is a film obtained by obliquely stretching a thermoplastic resin film prepared by melt-extrusion.

14. The broad-band circular polarization element as in claim 13, wherein the thermoplastic resin film is a polymer resin having an alicyclic structure.

* * * * *